(12) United States Patent
Matsumoto et al.

(10) Patent No.: US 6,985,517 B2
(45) Date of Patent: Jan. 10, 2006

(54) MATCHED FILTER AND CORRELATION DETECTION METHOD

(75) Inventors: Takenori Matsumoto, Yokosuka (JP); Naoshige Kido, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 782 days.

(21) Appl. No.: 09/984,993

(22) Filed: Nov. 1, 2001

(65) Prior Publication Data

US 2002/0054625 A1 May 9, 2002

(30) Foreign Application Priority Data

Nov. 9, 2000 (JP) ............................. 2000-341475

(51) Int. Cl.
*H04B 1/69* (2006.01)
*H04B 1/707* (2006.01)
*H04B 1/713* (2006.01)

(52) U.S. Cl. ................ 375/152; 375/150; 375/147
(58) Field of Classification Search ............... 375/152, 375/150, 227, 136
See application file for complete search history.

(56) References Cited

U.S. PATENT DOCUMENTS

| | | | |
|---|---|---|---|
| 5,903,595 A | 5/1999 | Suzuki | |
| 5,930,292 A | 7/1999 | Willis | |
| 6,028,894 A * | 2/2000 | Oishi et al. | 375/227 |
| 6,064,690 A * | 5/2000 | Zhou et al. | 375/142 |
| 6,094,449 A * | 7/2000 | Komatsu | 375/136 |
| 6,154,443 A * | 11/2000 | Huang et al. | 370/210 |
| 6,192,386 B1 | 2/2001 | Shinde | |
| 6,363,107 B1 * | 3/2002 | Scott | 375/150 |
| 6,731,706 B1 * | 5/2004 | Acharya et al. | 375/350 |
| 2002/0037030 A1 * | 3/2002 | Goto | 375/152 |
| 2002/0048316 A1 * | 4/2002 | Imaizumi et al. | 375/150 |

FOREIGN PATENT DOCUMENTS

| | | |
|---|---|---|
| EP | 0668663 | 8/1995 |
| EP | 1059818 | 12/2000 |
| EP | 1178638 | 2/2002 |
| JP | 10-173485 | 6/1998 |
| JP | 10-285079 | 10/1998 |
| JP | 2000-134134 | 5/2000 |

OTHER PUBLICATIONS

English Language Abstract of JP 10-285079.
English Language Abstract of JP 10-173485.
English Language Abstract of JP 2000-134134.

(Continued)

*Primary Examiner*—Stephen Chin
*Assistant Examiner*—Jia Lu
(74) *Attorney, Agent, or Firm*—Greenblum & Bernstein, P.L.C.

(57) ABSTRACT

The present invention provides a matched filter and correlation detection method that carries out correlation detection on a time-division basis on a reception signal with known periodic codes inserted as in the case of a preamble search by a base station that carries out a CDMA communication. The mobile station multiplies 16 types of signature codes by a common scrambling code, generates a preamble signal and carries out transmission. The base station carries out despreading by multiplying the scrambling code and reproduces the signature codes. Then, the first cumulative addition section carries out a cumulative addition on a plurality of sets of data portions at a same position corresponding to the cycle of the signature codes and then the multiplication section multiplies signature codes. Finally, the second cumulative addition section adds up symbols and detects a correlation.

10 Claims, 10 Drawing Sheets

OTHER PUBLICATIONS

Motorola and Texas Instruments, "Proposal for RACH Preambles", TSG-RAN WG1, Meeting #6, Aug. 7, 1999, XP002174961, retrieved from the internet on Aug. 15, 2001.

Nortel Networks "Clarifications on Golay-Hadamard Sequence Based RACH Preamble", TSG-RAN WG1, Meeting #7, Aug. 30, 1999, XP002260914, retrieved from the internet on Nov. 10, 2003.

Magill et al "Spread-Spectrum Technology for Commerical Applications", Proceedings of the IEEE, vol. 82, No. 4, Apr. 1, 1994, XP000451418, ISSN: 0018-9219.

* cited by examiner

MATCHED FILTER AND CORRELATION DETECTION METHOD

BACKGROUND OF THE INVENTION

1. Field of the Invention

The present invention relates to synchronization acquisition processing according to a spectrum direct sequence communication system, and more particularly, to a matched filter and correlation detection method used in preamble searching.

2. Description of the Related Art

A spread spectrum communication system (CDMA communication system) features intrusion resistance, high level of signal concealment and high frequency utilization efficiency, etc. and is used for mobile communications and space communications, etc.

When a mobile station (mobile terminal) requests a base station to start a communication, a cellular phone system based on a CDMA communication system transmits a preamble signal.

The preamble signal is a signal obtained by multiplying a known signature code (original signal) with periodicity by a common spreading code.

The signature code (original signal) is a code with a total length of 4096 symbols made up of a 16-bit basic data bit pattern appearing 256 times consecutively.

Here, 16 types of basic data bit pattern are provided. Therefore, as a result, there are also 16 types of signature code. Each signature code is used to identify a reception group and the mobile station side determines which signature code should be used as appropriate.

The mobile station that requests transmission to the base station selects any one of the above-described 16 types of signature code, spreads/modulates and sends this signature code to the base station as a preamble signal.

When a signature code (original signal) is spread/modulated, the signature code is multiplied by a common scrambling code (common spreading code).

The base station receives a spread spectrum signal in which the preamble signal is inserted, despreads it and detects the signature code (original signal). Thus, the base station recognizes the communication request from the mobile station and determines the mobile station with which communication is allowed to start.

The information on the signature code detection timing is used as the timing information to establish synchronization for communication with the mobile station with which communication is allowed to start.

The base station needs to instantaneously detect communication requests from many mobile stations that exist in a cell and determine to start a communication.

A digital matched filter (hereinafter simply referred to as "matched filter") is used to detect a signature code.

As a method for carrying out high-speed correlation detection at the base station, a method of detecting correlation is available whereby 16 matched filters are placed in parallel, multiplications are performed on 16 types of preamble signal in parallel (that is, simultaneously), the results are integrated in the time direction and a correlation is detected for every preamble signal (that is, for every signature code).

This configuration is shown in FIG. 9. FIG. 9 shows a case where 16 correlation detectors A1 to A16 are provided and each detector detects a correlation with one of signature codes (1) to (16).

Despreading code generation sections 104a and 104b each output data strings (that is, preamble signals) obtained by multiplying signature code (1) or signature code (2) by a common spreading code as despreading codes.

However, in the case of a circuit (FIG. 9) based on a system whereby 16 matched filters are placed in parallel and correlations of 16 types of preamble signal are detected simultaneously, the circuit scale increases significantly. This is accompanied by an increase of power consumption of the circuit.

Furthermore, the matched filter may be used not only for preamble searching but also for acquisition of synchronization and synchronization follow-up or RAKE combining and path determination processing for communications with directivity.

Thus, adopting a hardware configuration specialized only for preamble searching may involve a problem that that configuration will lack flexibility in the case of performing other processing and increase unnecessary parts of the circuit.

The present invention has been implemented focused on such problems and it is an object of the present invention to simplify the configuration of the matched filter section in particular to carry out high-speed preamble searching while keeping its flexibility and at the same time reduce both the circuit scale and power consumption.

SUMMARY OF THE INVENTION

The present invention, focused on the periodicity of a signature code (original signal) which serves as the source for creation of a preamble signal, replaces the conventional method of carrying out simultaneous and parallel correlation detection processing by a method of processing on a time-division basis (time-division system) to reduce the scale of the circuit.

That is, when a reception signal is despread and a correlation is detected, a prior art multiplies the reception signal by a common spreading code and signature code and performs a cumulative addition on sets of symbols of the resulting signals and detects a correlation.

That is, the prior art carries out correlation detection using the procedure shown in expression (1) below.

$$\ll(\text{common spreading code} \times \text{signature code}) \times \text{reception signal}\gg \quad (1)$$

where $\ll\gg$ means an operation of cumulative addition of a reconstructed symbol.

In contrast, the present invention first multiplies the reception signal by a common spreading code and then carries out a first cumulative addition. Then, the present invention multiplies the result of the first cumulative addition by a signature code and performs a cumulative addition on sets of symbols of the resulting signals (second cumulative addition).

That is, the correlation detection procedure of the present invention is as shown in expression (2) below.

$$\ll \ll(\text{common spreading code} \times \text{reception signal})\gg \times \text{signature code}\gg \quad (2)$$

where $\ll\gg$ means an operation of cumulative addition of a reconstructed symbol.

The calculation result according to the procedure in expression (1) above is equivalent to the calculation result according to expression (2).

Thus, the present invention does not perform calculations for correlation detection at a stroke but performs calculations step by step at a plurality of times on a time-division basis and carries out a first cumulative addition at some midpoint of processing focused on the periodicity of a signature code.

Using such a correlation detection method based on a time-division system requires the first despreading processing only to multiply the reception signal by a common spreading code, which allows the first despreading processing to be carried out by one (common) multiplication circuit and suppresses the circuit scale from increasing.

Furthermore, carrying out the first cumulative addition reduces the number of symbols, for example, to 1/256, alleviating the burden on the data processing thereafter.

Then, the result of the first cumulative addition is multiplied by a signature code and finally a second cumulative addition is performed to detect a correlation, which allows extremely efficient and high-speed correlation detection processing using minimum hardware most effectively.

Adding some contrivance such as applying parallel processing using a plurality of multipliers to multiply the signature code further improves the processing efficiency.

Improving the circuit configuration of multipliers themselves or using a minimum volume of memory on a time-division basis, etc. can further reduce the circuit scale or simplify the circuit design.

In a preferred mode of the present invention, a common spreading code (despreading code) is multiplied on the reception signal first. From the bits that make up the resulting signal, a set of data bits corresponding to the cycle of the signature codes (original signals) which are relatively in a same positional relationship are extracted. Then, a cumulative addition (first cumulative addition) is applied to every set of the extracted bits. Then, a signature code (original signal) is multiplied and cumulative additions are performed on symbols (second cumulative addition).

It is possible to reduce the circuit scale significantly by separately carrying out multiplication of a spreading code and multiplication of a signature code (original signal), and carrying out cumulative additions in two stages using the periodicity of the original signal.

The effect of the ability of the present invention to carry out calculations with a smaller circuit scale than the conventional art becomes more outstanding as the number of original signals to be calculated (types of preamble signal) increases.

Furthermore, even when codes are multiplied, adopting a system of selecting an input of the selector according to the code pattern makes it possible to perform programming freely so as to match the code pattern, thus securing the degree of freedom of the circuit.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

(Embodiment 1)

The matched filter of the present invention is used when a CDMA communication base station apparatus receives a signal sent from a mobile station and carries out a preamble search.

Before explaining a specific configuration of the matched filter, an overall configuration of the CDMA communication base station apparatus will be explained using FIG. 7.

Figure 7:
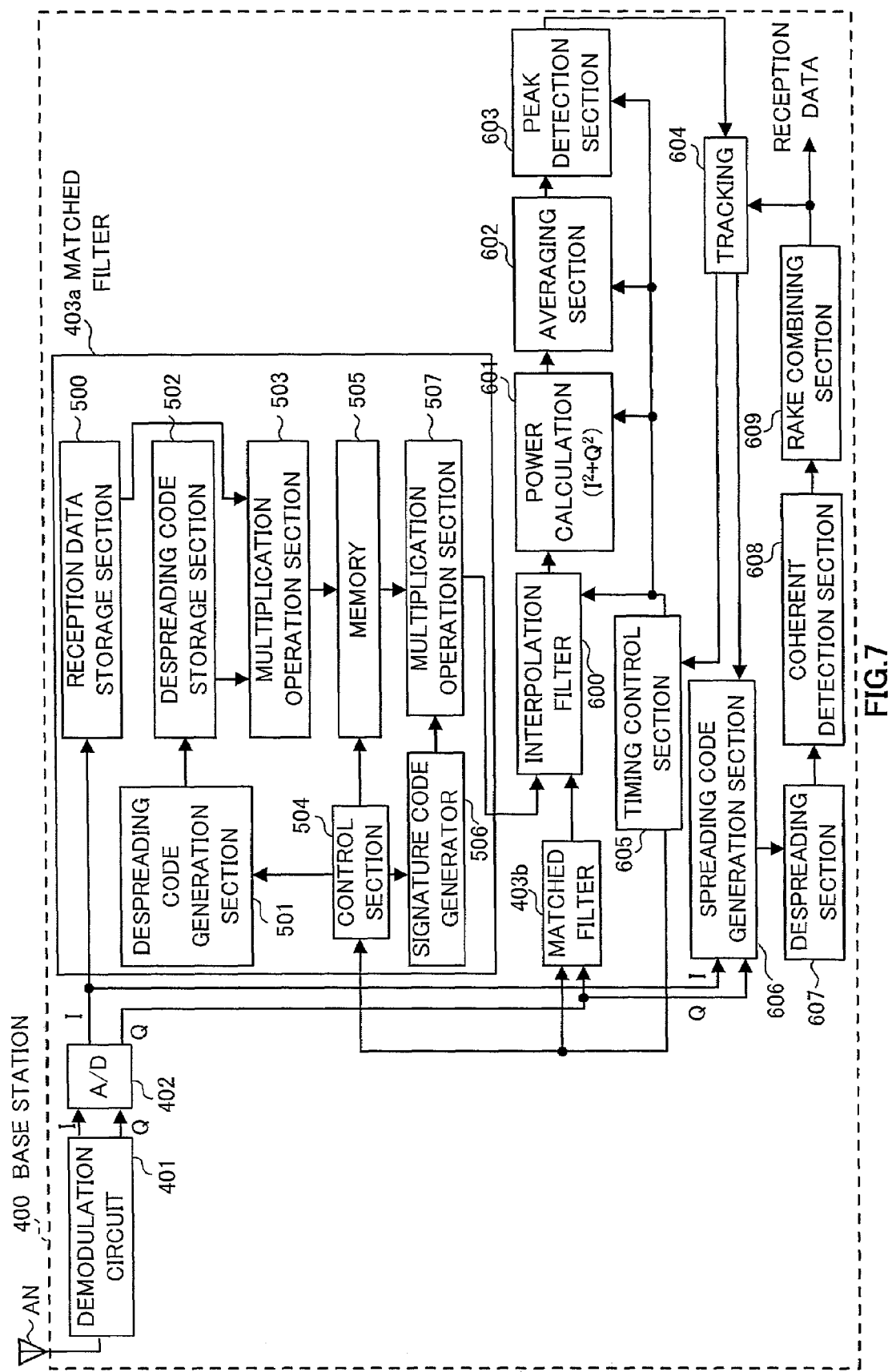
FIG. 7 is a block diagram showing a configuration of a CDMA communication base station apparatus of the present invention.

As shown in FIG. 7, a QPSK (Quadri-Phase Shift Keying) signal received by antenna AN of base station 400 is demodulated by demodulation circuit 401. As a result, an I (in-phase component) and Q (quadrature component) signals are output.

The I and Q signals are converted to digital signals by A/D converter 402 and given to matched filters 403a and 403b provided for respective signals.

Matched filter 403a is a correlation detector for processing of the I signal and matched filter 403b is a correlation detector for processing of the Q signal.

A configuration and calculation method of the matched filters will be described in detail later. Matched filter 403a (also matched filter 403b) stores data in reception data storage section 500 temporarily.

A despreading code (same as spreading code and may also be described as a spreading code) generated from despreading code generation section 501 is temporarily stored in despreading code storage section 502.

Then, at multiplication operation section 503, the despreading code is multiplied on the reception data and a cumulative addition (in-phase addition) is performed according to the cycle of a signature code (first in-phase addition) and the result is stored in memory 505.

The data read from memory 505 is multiplied by, for example, each of 16 types of code generated by signature code generator 506 and the data of each symbol resulting from the multiplication is subjected to a cumulative addition (in-phase addition) (second cumulative addition). In this way, correlation detection is performed on the preamble signal included in the reception signal.

The I and Q correlation values (correlation signals) output from matched filters 403a and 403b are input to power calculation section 601 via interpolation filter 600. Then, the reception power is calculated as $I^2+Q^2$.

Then, averaging section 602 averages the calculated reception power over a predetermined time width (window width taking into account a propagation delay required for a preamble signal to propagate from the mobile station to the base station).

Then, peak detection section 603 compares the averaged power with a threshold and detects peaks. In this way, a delay profile is created.

From the delay profile, it is possible to detect which signature code has been received with what amount of delay.

When it is detected, as a result of creation of the delay profile, that a preamble signal has been transmitted, the base station starts control (demodulation search) to establish communication synchronization with the mobile station in order to give communication permission.

Timing control for synchronization establishment is carried out by tracking section 604 and timing control section 605.

The code generation timing of spreading code generation section 606 is controlled by a timing control signal output from tracking section 604 and the reception signal is despread by despreading section 607 then subjected to coherent detection and RAKE combining by coherent detection section 608 and RAKE combining section 609, respectively.

This is the explanation about the overall configuration of the base station system.

Then, correlation detection regarding a preamble signal which is inserted in the reception signal using the matched filter of the present invention will be explained.

First, a basic configuration of the matched filter of the present invention and a basic procedure for detecting a correlation regarding a preamble signal will be explained using FIG. 1.

Figure 1:
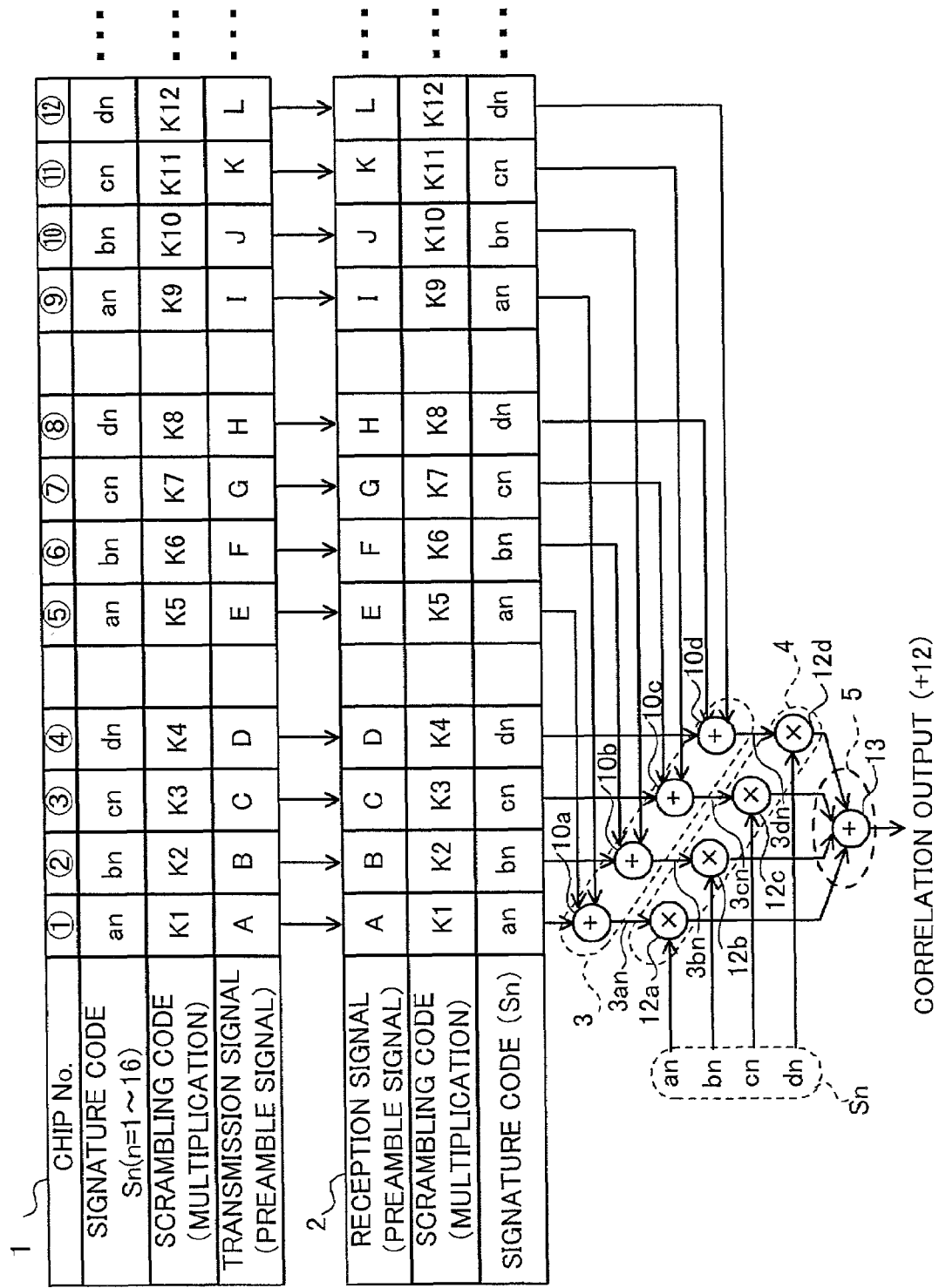
FIG. 1 illustrates a configuration example of a matched filter of the present invention.

The mobile station 1 shown in FIG. 1 selects one of 16 types of signature code (original signal) Sn (n: one of 1 to 16) for transmission.

The signature code is a periodic code in which a basic pattern made up of "1" and "−1" is repeated.

To facilitate the understanding, suppose, in FIG. 1, a spreading factor is "1" and the basic data bit pattern (hereinafter referred to as "basic pattern") is made up of 4 symbols (4 chips). That is, in FIG. 1, the basic pattern consists of 4 symbols of "ab, bn, cn and dn (n: one of 1 to 16)".

Each of "ab", "bn", "cn" and "dn" takes a value of "1" or "−1".

In this way, the periodic signature code using such a basic pattern (4 symbols) as a unit is multiplied by a common spreading code (scrambling codes "K1, K2, K3, K4 . . . ") and thereby a preamble signal is created.

In FIG. 1, each bit of the preamble signal is expressed by "A" to "L".

As described above, the spreading factor is "1" here. That is, a one-symbol period of the signature code is the same as a one-chip period of the spreading code. Therefore, one symbol is equivalent to one chip. In the following explanation, a term "symbol" will be used to refer to the data before being multiplied by a spreading code.

The preamble signal is multiplexed with a transmission signal and transmitted.

Base station apparatus 2 carries out despreading by multiplying the preamble signals (A to L) included in the reception signal by scrambling codes (K1 to K12 . . . ). If synchronization is established, the signature codes (Sn) are reconstructed as a result of despreading.

Then, a set of symbols placed at relatively equivalent positions corresponding to the cycle of signature codes are extracted and a first in-phase addition is carried out.

More specifically, for data "an" of chip number ① shown at the top of FIG. 1, data "an" of chip numbers ⑤ and ⑨ in a positional relationship corresponding to the cycle of signature codes are extracted and this set of "an"s are subjected to a cumulative addition by cumulative adder 10*a*.

Likewise, data "bn" of chip numbers ②, ⑥ and 10 are subjected to a cumulative addition by cumulative adder 10*b*.

Likewise, data "cn" of chip numbers ③, ⑦ and 11 are subjected to a cumulative addition by cumulative adder 10*c*.

Data "dn" of chip numbers ④, ⑧ and 12 are subjected to a cumulative addition by cumulative adder 10*d*.

Thus, a set of "an"s, a set of "bn"s, a set of "cn"s and a set of "dn"s are extracted and the first cumulative addition section 3 (adders 10*a* to 10*d*) executes cumulative additions (first in-phase addition).

When described more exactly, adder 10*a* performs a cumulative addition on the same number of "an"s as the number of times the basic pattern is repeated ("an"s positioned at the first symbol of the basic pattern). Here, if a correlation is established, adder 10*a* outputs 3 an.

Likewise, adders 10*b*, 10*c* and 10*d* perform a cumulative addition (in-phase addition) of a set of "bn"s, a set of "cn"s and a set of "dn"s, respectively.

Then, multiplication section 4 (provided with multipliers 12*a* to 12*d*) multiplies each of 16 types of signature code Sn sequentially at different times.

Then, second cumulative adder 5 (provided with adder 13) performs a cumulative addition on symbols of a symbol string obtained as a result of multiplication (second cumulative addition) for every signature code. The second cumulative addition adds up 4 lines of data.

The circuit in FIG. 1 performs calculations for a total of 12 symbols. Therefore, if a correlation is established, a correlation value "+12(=3×4)" is output. Correlation detection is performed in this way.

In this way, the matched filter in FIG. 1 performs the following characteristic operations:

① First, a common spreading code is multiplied and then a signature code (original signal) is multiplied. That is, codes are multiplied not at a stroke but on a time-division basis.

② After a common spreading code is multiplied, a set of data bits (for example, a set of "an"s) in a relatively equivalent positional relationship focused on the periodicity of signature codes (original signals) are subjected to a cumulative addition (in-phase addition) to reduce the number of symbols. In FIG. 1, the number of symbols is reduced to "4" (equal to the number of symbols of the basic pattern).

③ Then, signature codes Sn are sequentially multiplied at different times to detect a correlation. Then, a final cumulative addition (in-phase addition) is performed for every signature code. That is, a cumulative addition (in-phase addition) is also carried out on a time-division basis.

That is, multiplying a code obtained by multiplying a spreading code by a signature code on the reception signal and then subjecting each symbol to a cumulative addition (conventional system) is equivalent to multiplying the reception signal by a spreading code and thereby performing a cumulative addition and then multiplying the signature code and finally performing a cumulative addition on each symbol (time-division system of the present invention), and the results obtained are the same.

Thus, an outstanding feature of the processing of the present invention consists in adopting a concept of carrying out multiplications in different steps in the time direction and a concept of carrying out a first cumulative addition at some midpoint of processing focused on the periodicity of signature codes.

Here, a correlation detection method using an in-phase addition (cumulative addition) will be explained briefly.

An in-phase addition (cumulative addition) is a calculation method used to create a delay profile (calculation of reception power) using known symbols (preamble signals and pilot signals) inserted for initial synchronization and synchronization follow-up when two lines of mutually orthogonal reception signals (I component, Q component) such as QPSK exist.

That is, in a calculation of reception power, instead of directly calculating $I^2+Q^2$ and carrying out averaging processing, this is a method of carrying out cumulative additions of $(I+I+I \ldots +I)$ and $(Q+Q+Q+ \ldots +Q)$ about a plurality of continuous in-phase symbols and adding up the squares of these cumulative addition results.

Adopting such a method has advantages that the absolute values of signals increases through cumulative additions, noise signals randomly superimposed on the reception signals are cancelled out through addition operations, thereby improving the accuracy of calculations of reception power.

Figure 10:
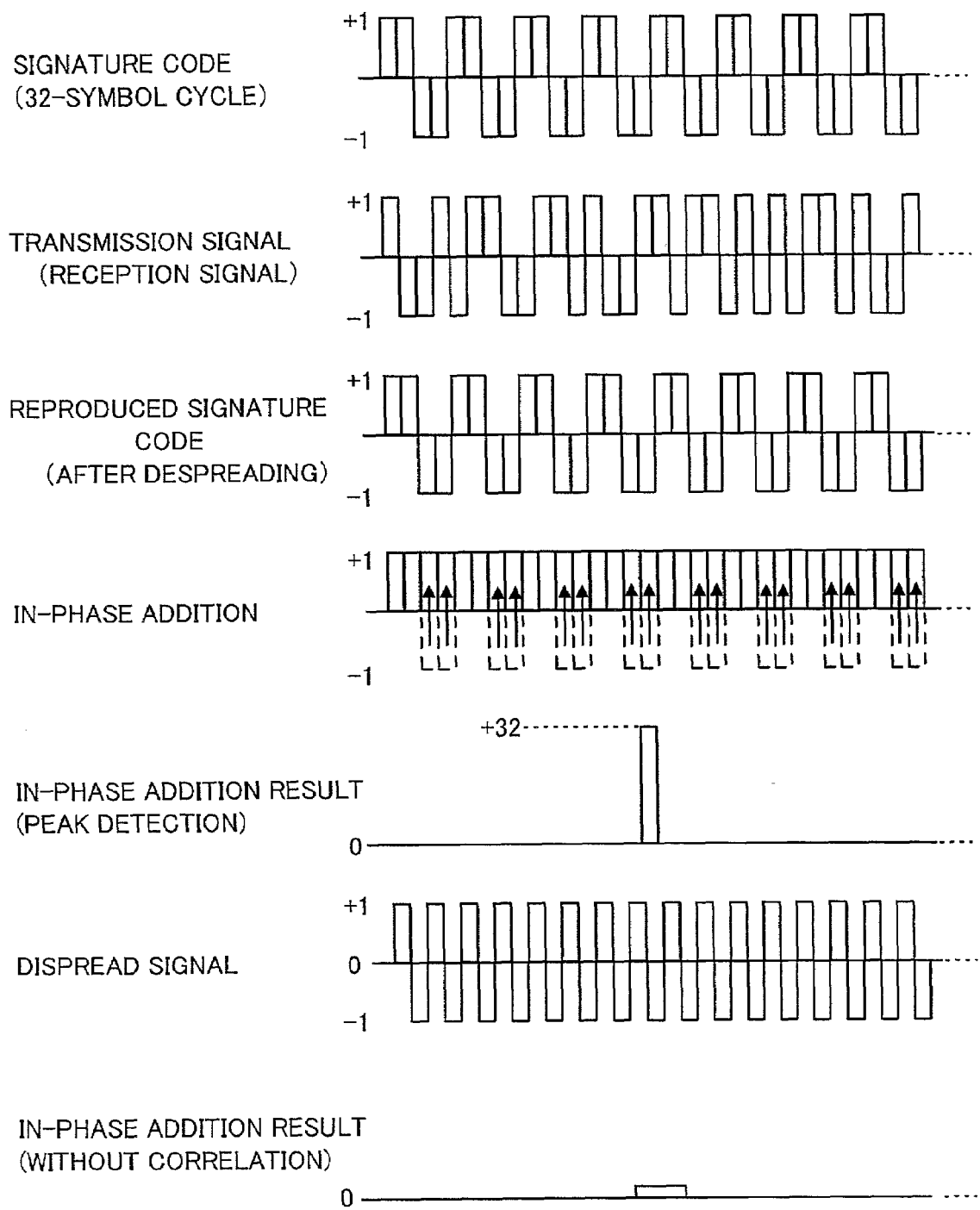
FIG. 10 illustrates signal waveforms to explain a correlation detection method (conventional example) by in-phase addition calculation using signature codes (known periodic signals).

A specific example of in-phase additions is shown in FIG. 10.

The signal waveform shown at the top of FIG. 10 shows a signature code with a cycle of 32 symbols.

Multiplying this signature code by a common scrambling code (spreading code) creates a preamble signal as described on the second row of FIG. 10 and this becomes a transmission signal (and reception signal).

Multiplying the reception signal by a scrambling code (spreading code) on the receiving side reconstructs (reproduces) the signature code as shown in the signal waveform described on the third row of FIG. 10.

Then, multiplying on the receiving side the same signature code as that multiplied on the transmitting side at synchronized timing gives all symbol data placed on the positive side as shown by the signal waveform described on the fourth row of FIG. 10.

Carrying out an in-phase addition (cumulative addition) in this state outputs a correlation peak value (+32) and detects a correlation as shown by the signal waveform on the fifth row of FIG. 10.

On the other hand, when a different signature code is multiplied or when multiplication timing is not synchronized, the despread signal waveform becomes as shown by the signal waveform on the sixth row of FIG. 10. When an in-phase addition is applied to this signal, the correlation value becomes almost zero as shown by the signal waveform on the seventh row of FIG. 10 and no correlation is detected.

This is the explanation of in-phase addition (cumulative addition).

Figure 2:
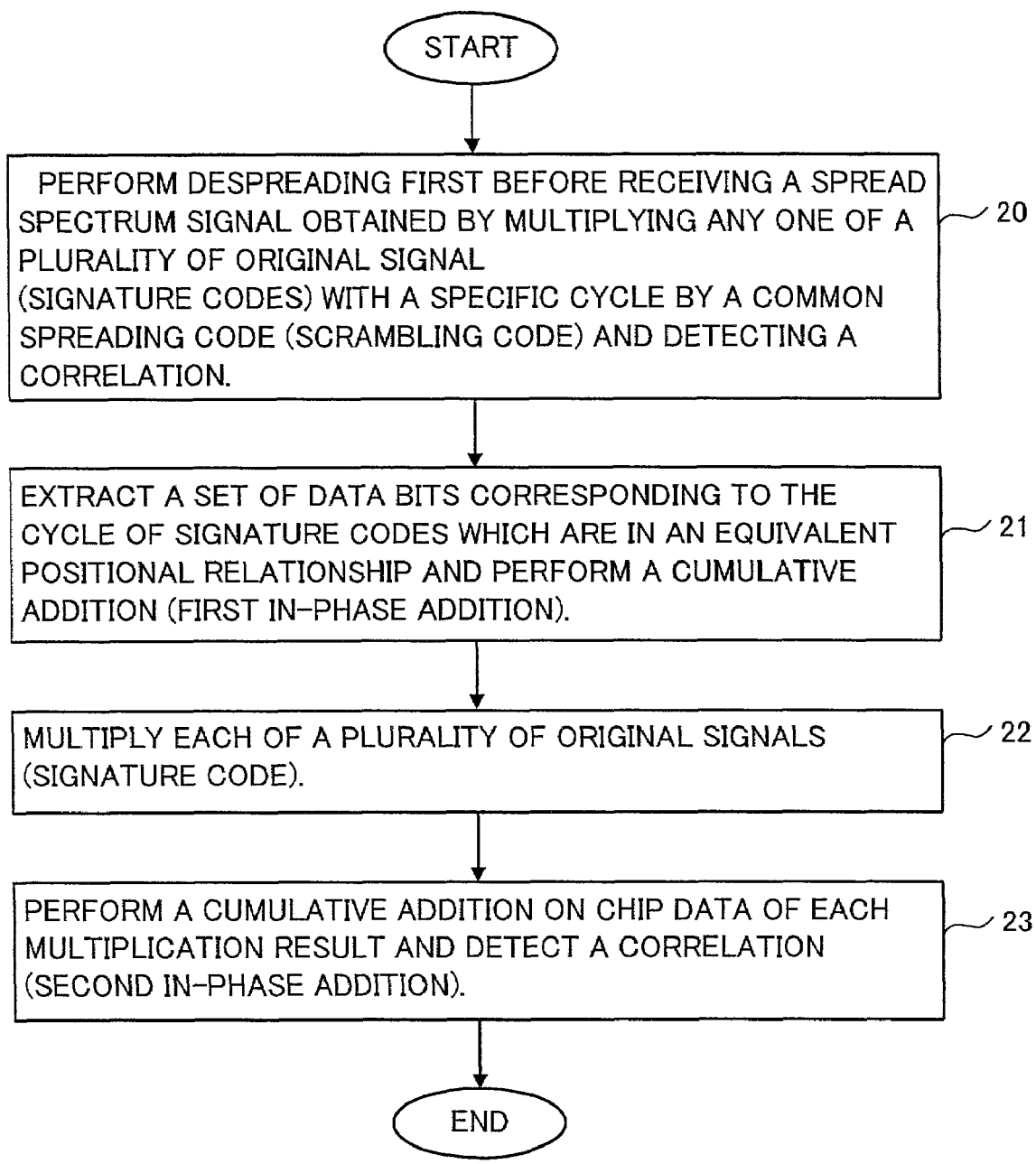
FIG. 2 is a flow chart to explain an operation of the matched filter shown in FIG. 1.

The procedure of the correlation detection calculation method of the present invention explained using FIG. 1 is summarized as shown in FIG. 2.

That is, despreading is performed first before receiving a spread spectrum signal obtained by multiplying any one of a plurality of original signals (signature codes) with a specific cycle by a common spreading code (scrambling code) and detecting a correlation (step 20).

Then, a set of data bits corresponding to the cycle of the signature code which are in an equivalent positional relationship are extracted and a cumulative addition (in-phase addition) is performed on each set (step 21).

Then, each of the plurality of original signals (signature codes) is multiplied (step 22). Then, a cumulative addition is performed on symbol data (in-phase addition) for every multiplication and a correlation is detected (step 23).

When such a processing method is adopted, despreading is carried out by a common circuit, which suppresses the increase of the circuit scale.

Furthermore, carrying out a first cumulative addition (in-phase addition) focused on the periodicity of the signature code (original signal) which servers as the source of creation of a preamble signal reduces the number of symbols. More specifically, the number of symbols is equal to the number of symbols making up the basic pattern.

Thus, a correlation is detected by carrying out multiplications of signature codes (parallel, time-division, simultaneous use of parallel/time-division, etc.) and finally carrying out a second cumulative addition (in-phase addition) while making the most of the hardware performance.

Thus, it is possible to attain the most efficient processing using minimum hardware. Furthermore, adjusting the configuration of multipliers or using a minimum memory on a time-division basis, etc. can further reduce the circuit scale and secure the flexibility of the circuit.

More specific advantages of the present invention will be explained in the following embodiments.

(Embodiment 2)

Figure 3:
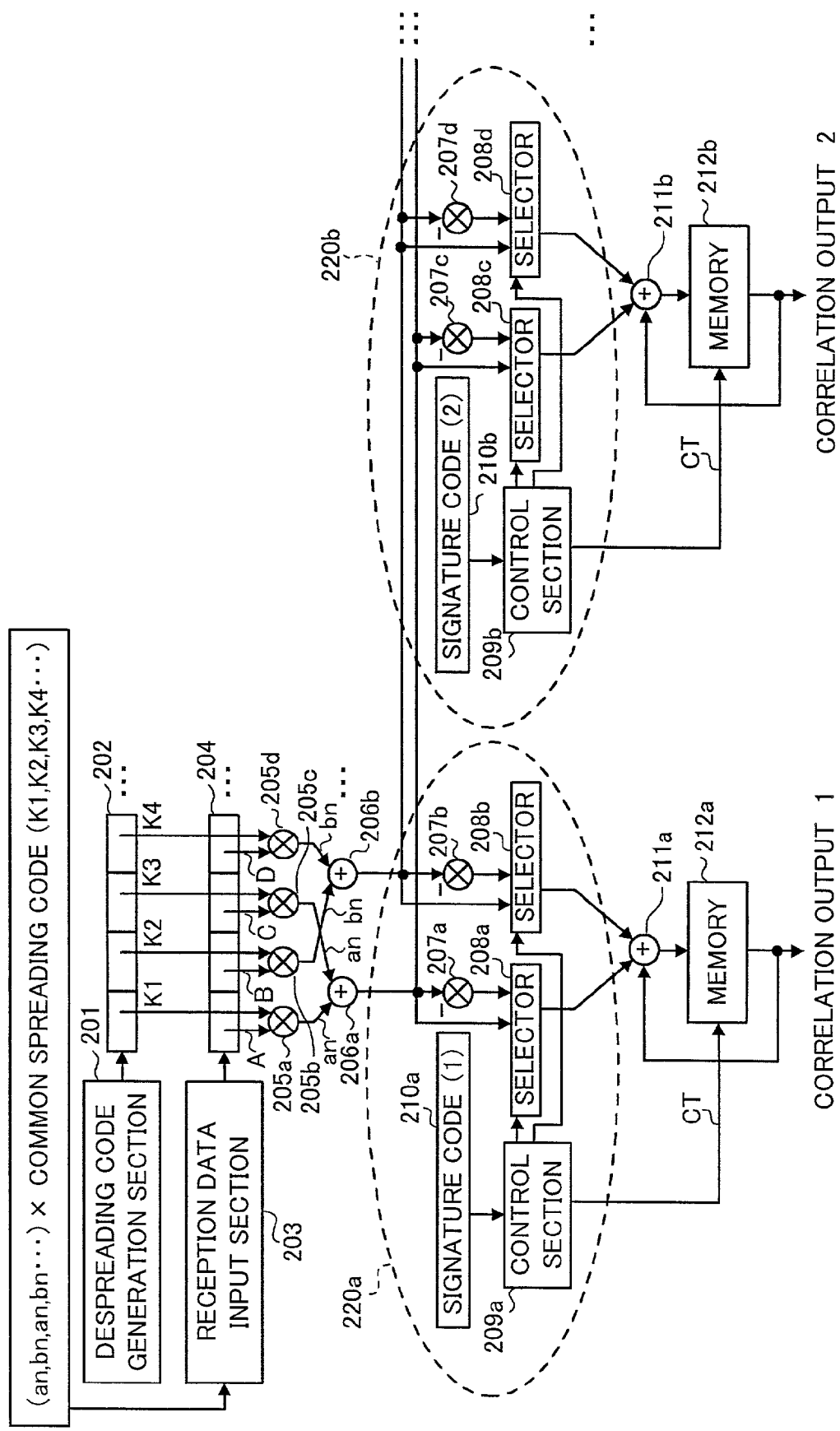
FIG. 3 is a block diagram showing another configuration example of the matched filter of the present invention.

FIG. 3 is a block diagram showing a specific configuration example of the matched filter of the present invention.

For convenience of explanations, FIG. 3 simplifies registers, etc. assuming that a signature code consists of repetitions of a basic pattern made up of two symbols of {an, bn}.

That is, the transmitting side (mobile station) creates preamble codes by multiplying signature codes consisting of repetitions of a basic pattern made up of two symbols of {an, bn} by common spreading codes (K1, K2, K3, K4 . . . ) and sends those preamble codes to the base station.

That is, in the following explanations, the signal obtained by spreading spectrum of the signature code having a two-symbol cycle at spreading factor "1" becomes the information for establishment of synchronization. Since the spreading factor is "1", one symbol has the same period as one chip. Then, the case where the base station carries out an in-phase addition over an 8-symbol period after despreading will be explained.

Furthermore, for convenience, suppose two kinds (1, −1) and (−1, 1) as the signature code. The first is expressed as signature code (1) and the latter is expressed as signature code (2).

Suppose such a premise will also be applied in the following embodiments in the like manner. By the way, the above-described premise is simply intended for simplification for convenience of description, and the signature code actually has a length of 16 symbols and there are 16 types of signature code.

Moreover, the value of a transmission symbol is normally expressed in a binary number "0" or "1" and in response to this, suppose digital data takes a value "1" or "−1".

In FIG. 3, despreading codes (K1 to K4) generated by despreading code generation section 201 are stored in register 202. On the other hand, reception data (A to D) is temporality stored in register 204.

Then, multipliers 205a to 205d multiply the reception data by despreading codes first.

Then, focused on the periodicity of the signature code, the symbol data at the same position of the basic pattern is extracted over two cycles and adders 206a and 206b perform cumulative additions (first in-phase addition).

This reduces the number of symbols down to the number equivalent to the number of times the basic pattern is repeated in the signature code. That is, it is possible to reduce the number of symbols without impairing the periodicity of the data string.

As a matter of course, additions are carried out, for example, every 16 symbols when the symbol data before spreading has a cycle of 16 symbols.

In the matched filter in FIG. 3, the above-described configuration constitutes the first correlation detection section for detecting a correlation about a common spreading code.

Output signals of adder 206*a* and 206*b* are branched to two lines (originally 16 lines) to simultaneously multiply two kinds of signature code (signature codes (1) and (2)) in parallel.

Multiplication sections 220*a* and 220*b* are provided to multiply signature code (1) and signature code (2), respectively. One multiplier is constructed of code inverter 207*a* (207*b* to 207*d*) and selector 208*a* (208*b* to 208*d*) with two inputs and control section 209*a* (209*b*).

Control section 209*a* (209*b*) performs changeover control to select which of an inversion signal and non-inversion signal input to select or 208*a* (208*b* to 208*d*) according to the array of "1" and "−1" of the signature code to be multiplied.

That is, when the signature code is "+1", the non-inversion signal is selected and when the signature code is "−1", the inversion signal is selected.

The configuration of switching the selector according to the pattern of the signature code has a high degree of flexibility and is convenient because it is programmable according to the code to be multiplied.

Then, adder 211*a* (211*b*) performs a cumulative addition on symbol data after being multiplied by the signature code (second in-phase addition).

The result of this second in-phase addition is stored in memory 212*a* (212*b*). This embodiment minimizes the number of shift register stages and the number of adders carrying out first and second cumulative additions to reduce the circuit scale, and therefore cannot perform cumulative additions at a stroke by only the required number of symbols.

Thus, this embodiment requires time-division processing. For this reason, this embodiment provides small-volume memory 212*a* (212*b*) and allows this memory to store data little by little, circulates the data and carries out second cumulative addition processing.

Input (write) and output (read) timings of memories 212*a* and 212*b* are controlled by control signal CT from control sections 209*a* and 209*b*, respectively.

The section of the matched filter in FIG. 3 that multiplies the signature code and detects a correlation regarding the signature code constitutes the second correlation detection section.

Figure 4:
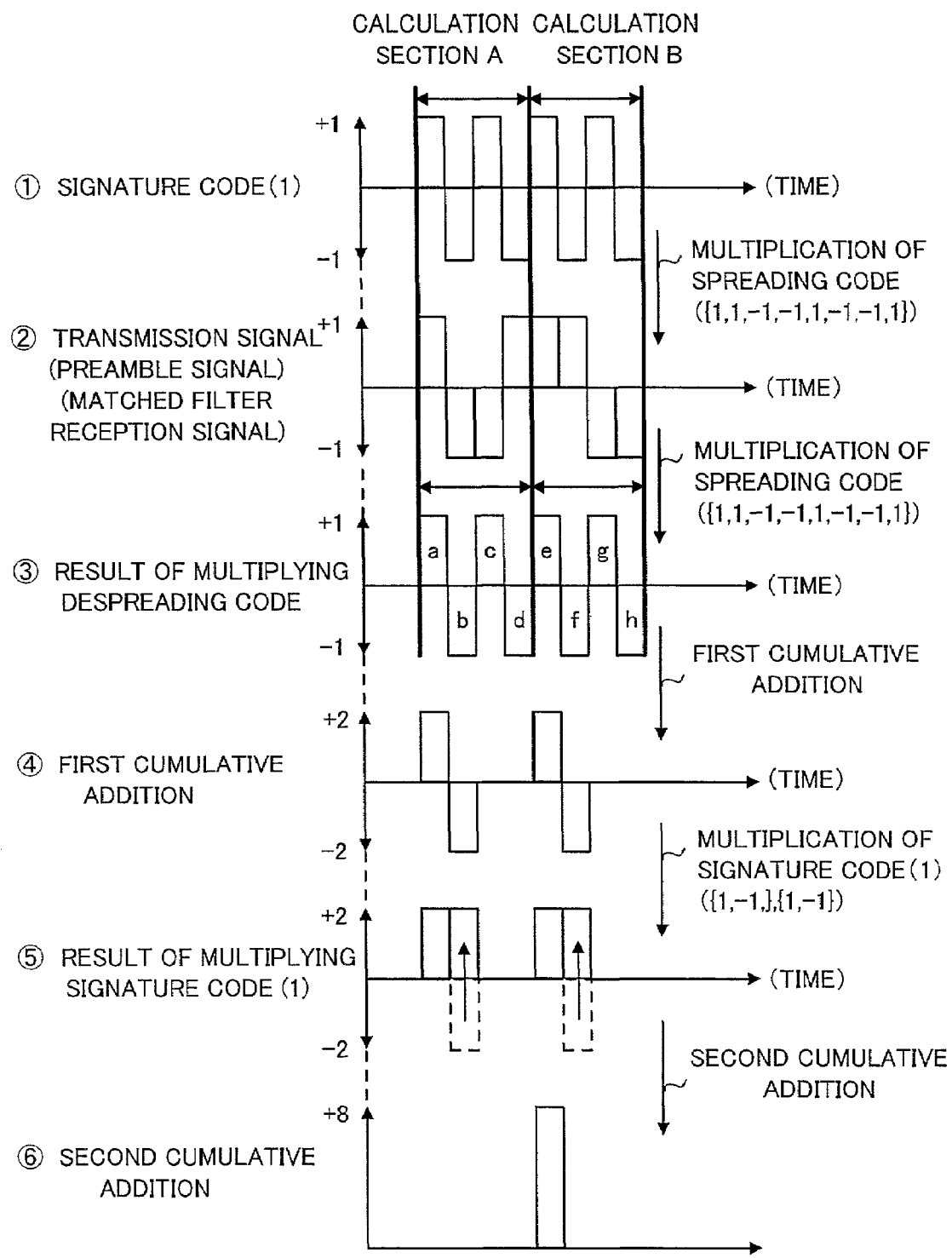
FIG. 4 illustrates a signal waveform to explain a main operation of the circuit shown in FIG. 3.

FIG. 4 shows the main processing content of the matched filter in FIG. 3.

Since the number of shift registers in FIG. 3 is 4, the number of symbols that can be added up at a time is 4.

Thus, to carry out an in-phase addition for 8 symbols, the calculation must be performed in two steps. In FIG. 4, the first calculation is described as calculation section A and the second calculation is described as calculation section B. A case where signature code (1) is multiplied will be explained below.

State ① in FIG. 4 shows a basic pattern (8 symbols) of signature code (1). A preamble signal is generated by multiplying these 8 symbols by spreading codes {1,1,−1,−1, 1,−1,−1,1} (state ② in FIG. 4: transmission signal).

This transmission signal (state ② in FIG. 4) is input to the matched filter as is.

The matched filter multiplies the first half 4 symbols of the received code by spreading codes {1,1,−1,−1} to calculate calculation section A first. As a result, symbol data in state ③ in FIG. 4, that is, data of {1,−1, 1,−} is obtained.

This data is added up every cycle of the signature code, that is, every two symbols.

That is, in state ③ in FIG. 4, cumulative additions a+c and b+d are performed. The results are "+2" and "−2" (state ④ in FIG. 4). These are equivalent to the outputs of adder 206*a* and 206*b* in FIG. 3.

These addition results are multiplied by signature code (1). As a result, the outputs of selector 208*a* and 208*b* in FIG. 3 are "+2" and "2" respectively (state ⑤ in FIG. 4).

These outputs are added up by adder 211*a* in FIG. 3 to become a value "+4" and stored in memory 212*a*.

Then, a calculation of calculation section B is carried out using the same procedure. That is, the last half 4 symbols (1,1,−1,−1) of the reception data are multiplied by despreading codes and the same processing as for calculation section A is carried out thereafter.

In the case of a calculation of section B, too, the output of adder 211*a* in FIG. 3 becomes a value "+4" in the same way as the case of calculation of section A.

Control section 209*a* in FIG. 3 reads "+4" stored in memory 212*a* as the result of calculation section A, adds it to "+4" the output of adder 211*a* of calculation section B to obtain "+8" and stores it in memory 212*a* again (state ⑥ in FIG. 4).

The matched filter of this embodiment can drastically reduce the circuit scale.

Figure 9:
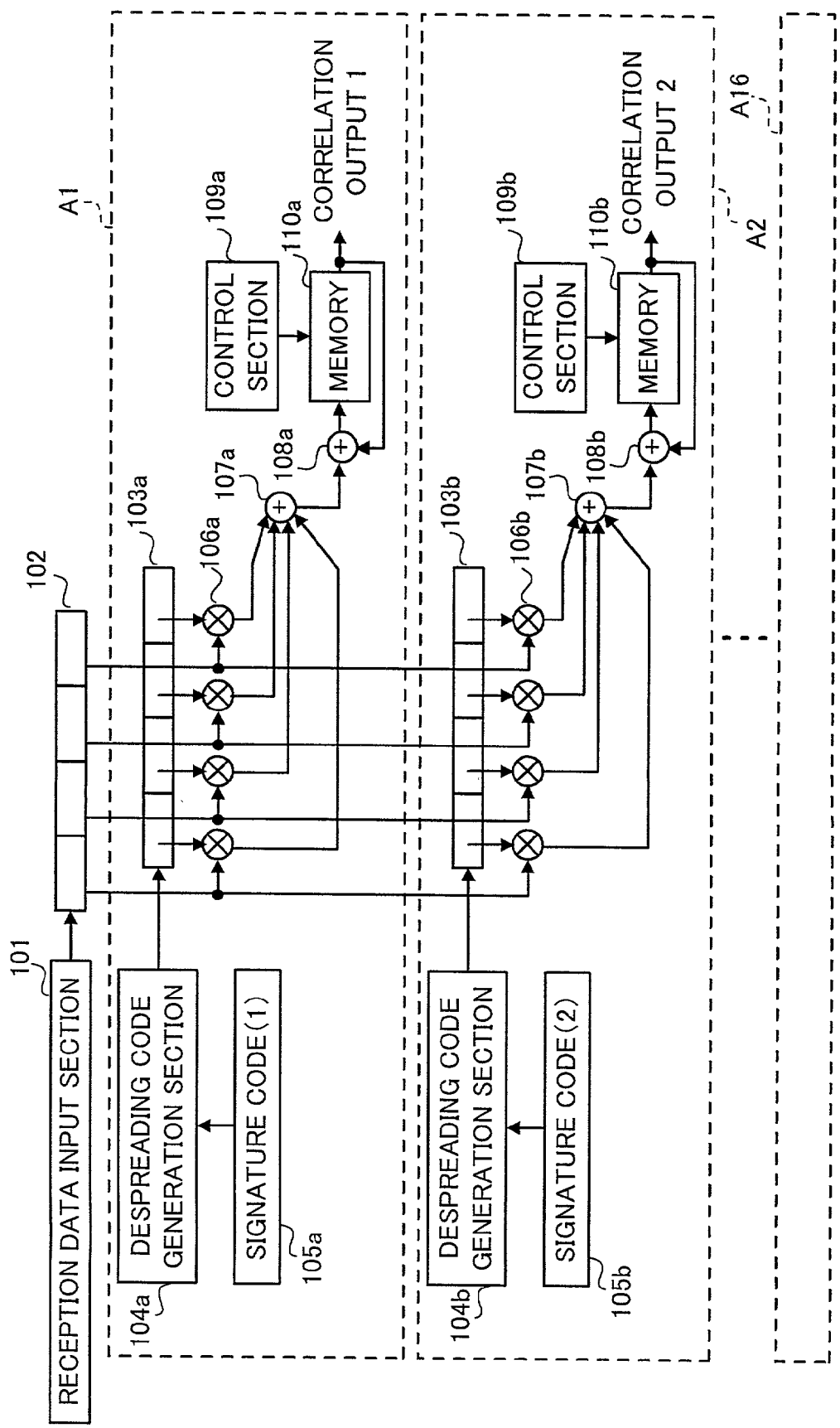
FIG. 9 is a block diagram showing a configuration of a matched filter (conventional example) not using the present invention.

FIG. 9 shows a configuration of a comparison example (conventional example). This comparison example (conventional example) adopts a configuration of providing correlation detection circuits (A1 to A16) in parallel by the number of types of signature code.

That is, codes are created by multiplying various signature codes by despreading codes and these are multiplied on the reception data simultaneously (in parallel) to determine a correlation value.

This configuration needs to provide correlation detection circuits corresponding to the number of types of signature code, thus increasing the circuit scale.

On the other hand, the configuration of this embodiment allows the section that carries out a multiplication of despreading codes to be used commonly, uses a hardware configuration of the minimum possible size, divides processing into steps in the time direction and carries out distributed processing as a flow production. Thus, this embodiment can fully reduce the hardware volume and attain low power consumption of the circuit.

(Embodiment 3)

Figure 5:
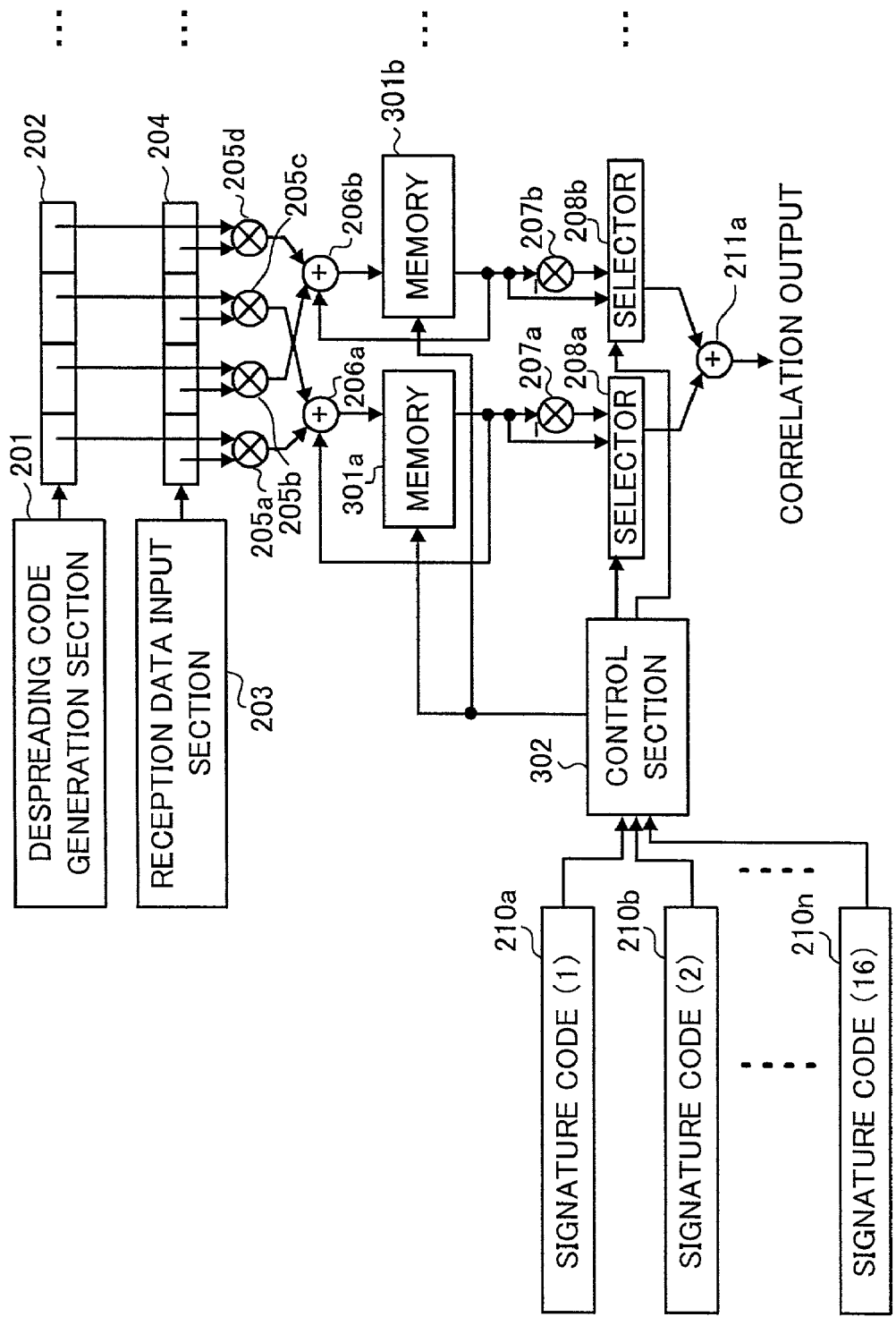
FIG. 5 is a block diagram showing another configuration example of the matched filter of the present invention.

FIG. 5 is a block diagram showing a configuration of a matched filter according to Embodiment 3 of the present invention.

As in the case of the circuit explained in the aforementioned embodiment, the matched filter in FIG. 5 is the same as the aforementioned embodiment in that it carries out a first in-phase addition according to the cycle of signature codes after despreading the received data and then multiplies various types of signature code and carries out a second in-phase addition to detect a correlation.

However, the circuit of this embodiment (case of FIG. 5) despreads reception data, carries out a first in-phase addition (cumulative addition), temporarily stores in memory, and after calculations for a predetermined number of symbols are completed, carries out multiplications of signature codes and a second in-phase addition.

That is, this embodiment stores the data after the first in-phase addition in memory, adjusts the timing of writing to or reading from this memory and thereby absorbs a mismatch in the processing speed between the processing up to the first in-phase addition, multiplications of signature codes and the processing of the second in-phase addition and is different in this respect from the circuit in FIG. 3.

This configuration can implement a desired correlation detection calculation with a smaller circuit scale than the circuit (FIG. 3) in Embodiment 2.

For convenience of explanations, as in the case of the above-described Embodiment, the following explanation will describe a case where the spreading factor is 1x, a signal on which an original signal (signature code) with a two-symbol cycle is spread is despread and then subjected to an in-phase addition over a period of 8 symbols.

Configurations and operations of reception data storage shift register 204, despreading code generation section 201 and despreading code storage shift register 202 are the same as those of the circuit in FIG. 3.

The results of additions of adder 206a and 206b are directly input to memories 301a and 301b and temporarily stored unlike Embodiment 2.

In order to perform an in-phase addition for an 8-symbol period, calculations for 4 symbols are repeated 2 times as in the case of Embodiment 1. Since reception signal storage shift register 204 and spreading code storage shift register 202 have a 4-stage configuration, despreading codes are newly set twice.

With the second despreading, the spreading codes are fixed and input data is shifted likewise. Then, the selectors (not shown) are switched for every cycle of a signature code and a first in-phase addition (accumulation) is performed and the result is stored in memories 301a and 301b.

With the second calculation for every 4 symbols, the moment data is output from adders 206a and 206b, data of the first calculation result is read from memories 301a and 301b and the data is added up by adders 206a and 206b and stored in memories 301a and 301b again.

After a calculation for a predetermined number of symbols is completed, data is read from memories 301a and 301b, multiplied by signature codes and a cumulative addition is performed on symbol data (second in-phase addition).

Control section 302 reads data from memories 301a and 301b. Then, while one portion of data is being read, control section 302 multiplies signature code (1) and signature code (2) consecutively.

In the case where the number of types of signature code is 16, these 16 types of signature code (signature code (1) to signature code (16)) are, for example, multiplied consecutively at a stroke.

Multiplications of signature codes are performed by selectors 208a and 208b changing between inversion and non-inversion data according to the bit array of signature codes. This embodiment is the same as Embodiment 2 in this respect.

Then, adder 211a performs a cumulative addition on symbol data portions resulting from the multiplications of signature codes (second in-phase addition).

Using a method of switching between the selectors for two times of signature codes (1) and (2) while one portion of data is being read from memory allows the correlation detection results of signature codes (1) and (2) to be output alternately.

When the clock frequency of reading data from memories 301a and 301b is assumed to be "A", the clock frequency of switching between selectors 208a and 208b is "2A" (first reading method).

The above-described explanation describes the case where a correlation of all signature codes is detected while data is being read from memory once, but the present invention is not limited to this.

There can also be a method whereby data is read from memories 301a and 301b twice and a multiplication and in-phase addition of signature code (1) are carried out in the first read and a multiplication and in-phase addition of signature code (2) are carried out in the second read (second reading method).

In the case of the first reading method, when the number of types of signature code increases, the selector needs to be changed at a faster clock.

On the other hand, in the case of the second reading method, the same clock can be used for reading from memory and selector changeover, but the time required to obtain the correlation result is longer than the first reading method. The selection of a reading method must be determined according to the function required.

This embodiment selects the number of times memory is read and the selector changeover speed according to limits of the hardware processing speed as appropriate and flexibly carries out time-division processing, and can thereby reduce the circuit scale.

(Embodiment 4)

Figure 6:
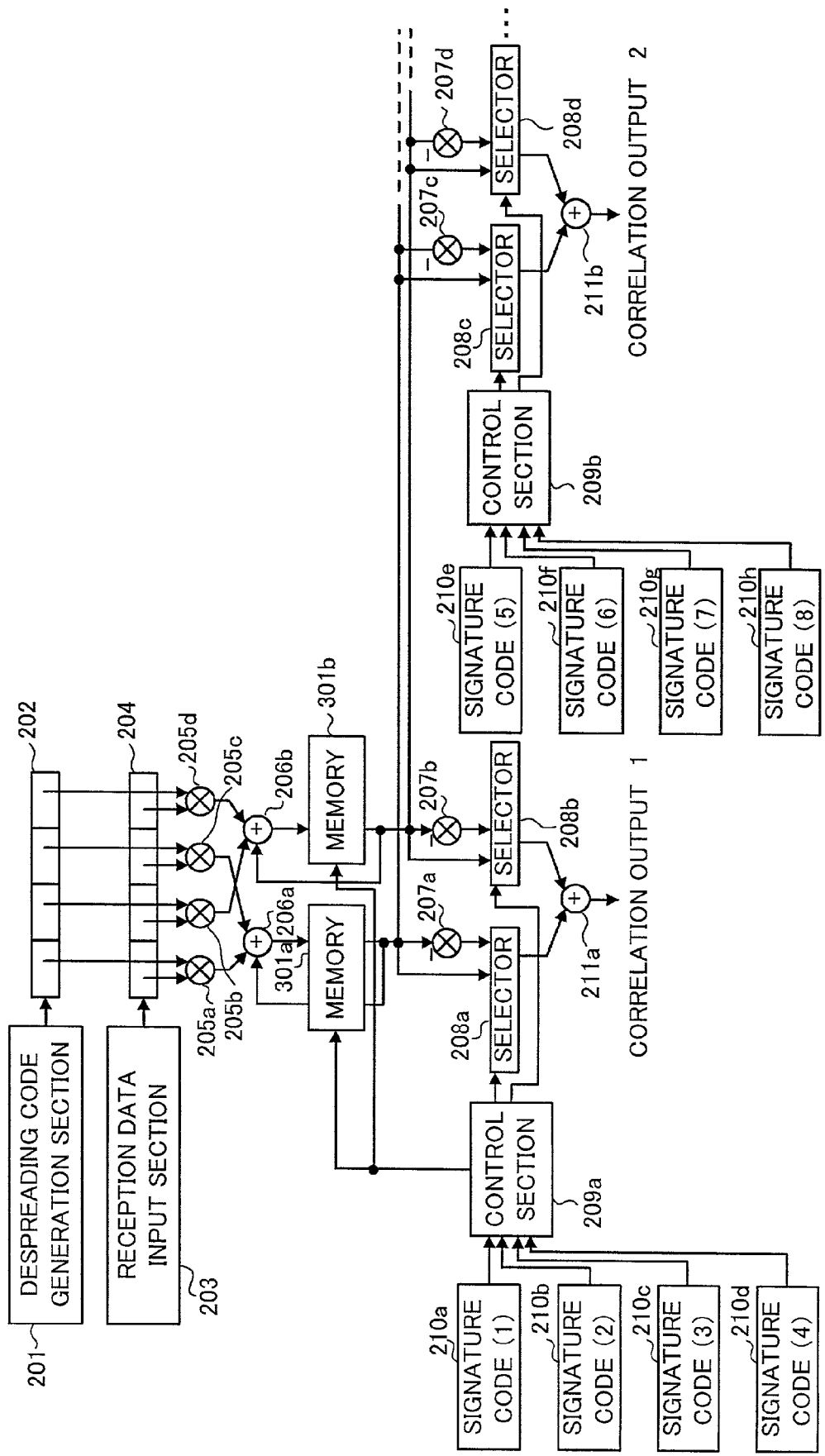
FIG. 6 is a block diagram showing another configuration example of the matched filter of the present invention.

FIG. 6 is a block diagram showing a configuration of the matched filter of the present invention. A circuit configuration and operation are basically the same as those in Embodiment 3 (matched filter in FIG. 5).

That is, this embodiment adopts the system of storing data in memory after a first in-phase addition and then carries out multiplications of signature codes and a second in-phase addition.

In the case of the matched filter in FIG. 5, which performs serial processing, the hardware processing cannot catch up with an increase in the number of types of signature code (code combination) causing an increase in the number of times of time-division, which tends to slow down the processing speed.

Therefore, this embodiment adopts concurrent use of parallel processing and time-division processing (combined parallel/time-division system) in order to maximize the hardware processing capacity and attain efficient processing.

The number of parallel processes is determined based on the type of signature code (number of combinations) and hardware processing speed. Assuming that a maximum of "m" signature codes can be multiplied while data is being read from memory one time, if the number of types of signature code (number of combinations) is "n", then the number of parallel processes p is determined by "n/m".

As illustrated in FIG. 6, if the number of types of signature code is 16 (signature codes (1) to (16)) and the maximum changeover frequency of selectors 208a to 208d is 4 times the read clock frequency of memories 301a and 301b, the number of parallel processes is "4(=16/4)".

That is, parallel processes of multiplying 4 different signature codes are carried out simultaneously.

Therefore, according to the circuit in FIG. 6, by one read from memories 301a and 301b, it is possible to perform correlation detection processing of a plurality of signature codes (multiplication processing and in-phase addition processing) in parallel, thus improving the processing efficiency.

The processing of the method in Embodiment b 3 alone may be limited, and as in the case of this embodiment, it is effective to combine parallel processes according to the processing speed and processing time required for processing as appropriate.

(Embodiment 5)

FIG. 7 is a block diagram showing a configuration of a CDMA communication base station apparatus using the matched filter of the present invention.

An overall configuration and operation of FIG. 7 are the same as those explained initially in Embodiment 1.

The spread spectrum communication system normally sends signals with phase modulation applied for a radio section. For this reason, demodulation circuit 401 on the receiving side demodulates the received signal subjected to phase modulation first. The demodulated signal is converted to a digital signal through A/D converter 402.

The converted digital signal is input to matched filter 403a. As explained in Embodiments 1 to 4 above, the matched filter is constructed of reception data storage section 500, despreading code storage section 502, despreading code generation section 501, memory 505 and multiplication operation section (including in-phase addition circuit), etc. and carries out despreading and in-phase addition on a plurality of signature codes. Correlation detection of each signature code is performed in this way.

Based on the calculated correlation value, power is calculated and a delay profile is created. The matched filter normally carries out despreading and in-phase addition corresponding to the number of symbols requested by the system up to the delayed reception signal.

By creating a delay profile, it is possible to determine which signature code is received with what amount of delay. Thus, timing information necessary for establishment of synchronization is obtained for every signature code (preamble search).

The synchronization information acquired at this time is used to establish synchronization for giving communication permission to the transmitting side based on the spread spectrum communication system.

That is, when a search with a preamble signal (preamble search) is completed, this is followed by a demodulation search for sampling a reception signal with a narrower time width than this preamble search.

Figure 8:
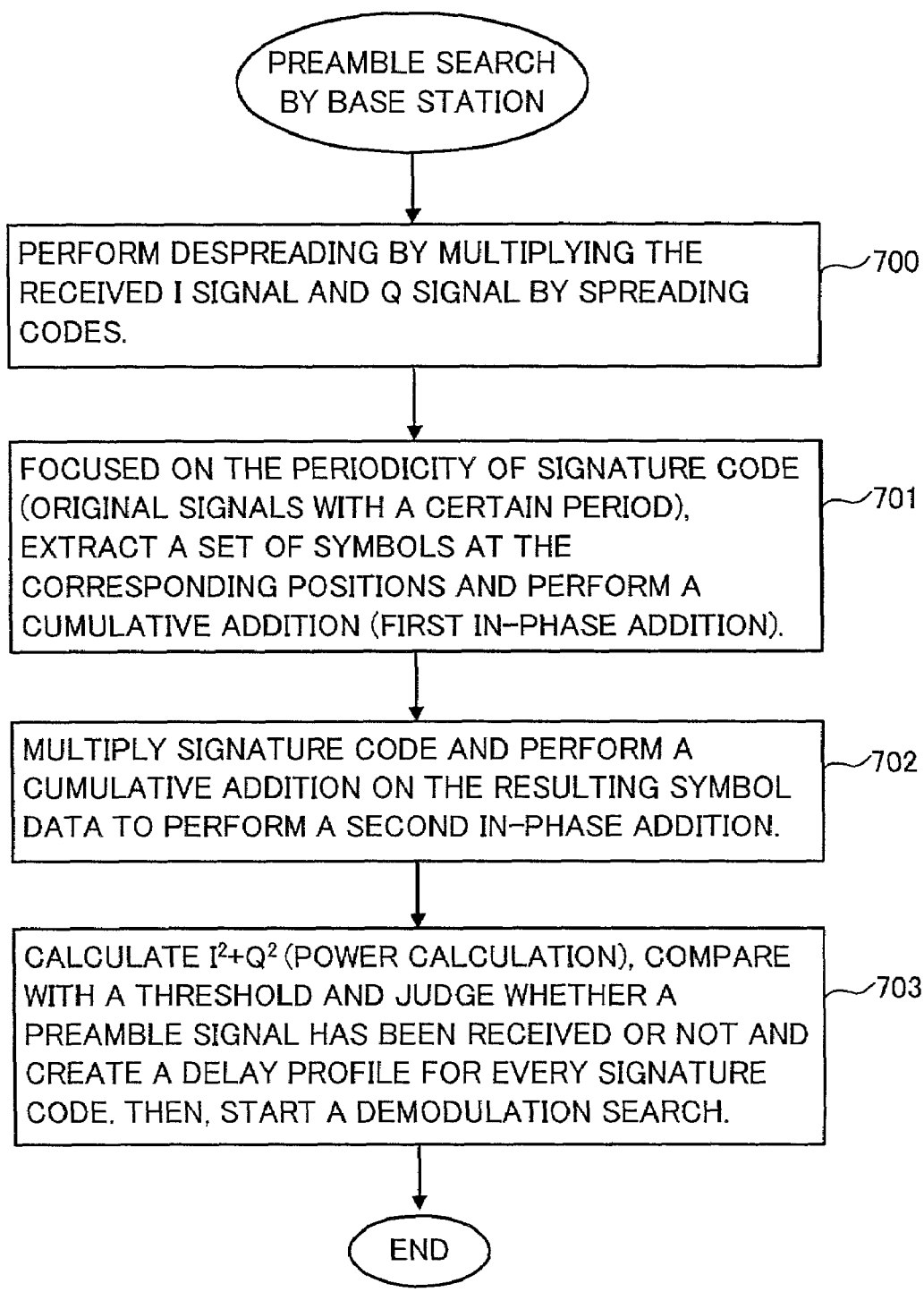
FIG. 8 is a flow chart showing a main operating procedure of the base station apparatus shown in FIG. 7.

The above-described operation of the base station can be summarized as shown in FIG. 8.

That is, despreading is performed by multiplying the received I signal and Q signal by spreading codes (step 700).

Then, focused on the periodic array of signature codes (original signals with a certain period), a set of symbols at the corresponding positions (at the same position in one cycle) are extracted and subjected to a cumulative addition (step 701).

Then, signature codes are multiplied and the resultant symbol data is subjected to a cumulative addition and then a second in-phase addition (step 702).

Then, $I^2+Q^2$ is calculated (power calculation), compared with a threshold and judged whether a preamble signal has been received or not and a delay profile is created for every signature code.

Then, the reception signal is sampled with a narrower time width than a preamble search to carry out a demodulation search (step 703).

Using the present invention can drastically reduce the scale of the circuit that carries out a preamble search at the base station apparatus. This can also reduce power consumption of the circuit.

FIG. 9 shows an example (conventional example) of a circuit that carries out correlation calculations in parallel for every signature code.

As described above, this circuit generates codes obtained by multiplying each signature code by a common despreading code in parallel and multiplies the reception data by these codes simultaneously. Such a circuit configuration requires the same number of despreading circuits as the number of types of signature codes, causing the circuit scale to become enormous. Moreover, since the hardware configuration is fixed, this circuit configuration is liable to incur waste.

On the other hand, the matched filter of the present invention performs despreading using a common circuit and can thereby suppress an increase of the circuit scale. The matched filter of the present invention reduces the number of symbols by periodically adding portions of data with a same value (first in-phase addition) focused on the periodicity of signature codes (original signals) which serve as the source of creation of a preamble signal, carries out multiplications of signature codes while maximizing the hardware performance (parallel, time-division, combined parallel/time-division) and finally carries out a second in-phase addition to detect a correlation.

Thus, the matched filter of the present invention can provide the most efficient processing making full use of minimum hardware. It can also adjust a multiplier configuration, use a minimum memory on a time-division basis, etc. to further reduce the circuit scale, thus securing the flexibility of the circuit.

The above-described explanations describe preamble search processing, but the present invention is applicable to processing for establishment of initial synchronization using pilot signals which are known non-modulated signals (can be regarded as periodic signals) as well.

As explained above, when a correlation needs to be detected instantaneously for each of a plurality of periodic signals included in a reception signal as in the case of a preamble search at a CDMA communication base station, the present invention can provide processing with maximum efficiency with a small circuit scale. Thus, the present invention realizes low power consumption of the circuit as well.

The present invention is not limited to the above described embodiments, and various variations and modifications may be possible without departing from the scope of the present invention.

This application is based on the Japanese Patent Application No. 2000-341475 filed on Nov. 9, 2000, entire content of which is expressly incorporated by reference herein.

What is claimed is:

1. A method for performing correlation detection using a matched filter, the method comprising:
   despreading a received spread spectrum signal by multiplying the received spread spectrum signal with a spreading code;
   performing a first cumulative addition on a result of the despreading;
   multiplying the result of the first cumulative addition with an original signal which becomes a target of the correlation detection; and
   performing a second cumulative addition on the result of the multiplication with the original signal.

2. A method for performing correlation detection of known original signals included in a received spread spectrum signal, the method comprising:
 despreading a received spread spectrum signal by multiplying the received spread spectrum signal with a spreading code to obtain a despread data bit string;
 extracting a plurality of sets of data bits in the despread data bit string with a relative positional relationship that matches a periodicity of the known original signals, and performing a first cumulative addition on the result of the extracting;
 multiplying a result of the first cumulative addition with a known original signal; and
 performing a second cumulative addition on a data string resulting from the multiplying with the known original signal.

3. A correlation detection method whereby a spread spectrum signal is received, the spread spectrum signal being obtained by multiplying a common spreading code on an original signal formed by consecutively repeating one data bit pattern selected from a plurality of types of known data bit patterns, the spread spectrum signal having periodicity and the plurality of types of known data bit patterns, the method comprising:
 despreading the received spread spectrum signal by multiplying the received spread spectrum signal with the common spreading code;
 extracting, from a despread data bit string, a set of data bits with a positional relationship that matches the period of the original signal, and performing a first cumulative addition on the extracted data bits;
 multiplying a result of the first cumulative addition with each of the plurality of original signals in parallel or sequentially; and
 performing a second cumulative addition for every result obtained by multiplying with one original signal, detecting a correlation for each of the plurality of original signals and thereby detecting the original signals included in the received spread spectrum signal.

4. A correlation detection method on a reception side in a communication system, in which predetermined original signals are provided, the original signals having a periodic array formed by repeating a unit pattern of n symbols m times, the original signals being capable of including any of p types of symbol arrays as a result of the existence of p types of the unit patterns, and synchronization establishment signals being provided at a transmitting end by multiplying each of the p types of unit patterns with a common spreading code, wherein each of m, n and p are natural numbers equal to or greater than 2, the correlation detection method comprising:
 performing despreading by multiplying received synchronization establishment signals with the common spreading code;
 delimiting a symbol string obtained as a result of the despreading in units of n symbols, extracting symbols at a same position for every m sections, performing a cumulative addition for every set of the extracted m symbol data portions and obtaining an n-symbol data string;
 multiplying the n-symbol data string with each of the p types of original signals sequentially or branching the n-symbol data string into at least two lines and multiplying each of the branched data strings with each of the p types of original signals in parallel, and outputting the symbol data string of the multiplication result for each of the p types of original signals; and
 performing cumulative addition on each of the output symbol data strings and outputting a cumulative addition result for each of the p types of original signals.

5. A synchronization establishment search method whereby a synchronization establishment signal is provided by multiplying any one of a plurality of known codes with a common spreading signal, wherein a base station apparatus that receives a spread spectrum signal, in which the synchronization establishment signal is inserted, detects the synchronization establishment signal and performs synchronization establishment processing for a communication, the synchronization establishment search method comprising:
 despreading a received spread spectrum signal by multiplying each of a received in-phase signal and quadrature signal with the common spreading code;
 extracting a plurality of symbols with relative positional relationships that correspond to cycles of the known code for each of the despread in-phase signal and quadrature signal, and performing a first cumulative addition on the result of the extracting;
 multiplying each of the in-phase signal and quadrature signal, after a first in-phase addition, with each of the plurality of types of known codes;
 performing a second cumulative addition on each symbol string resulting from the multiplying with the known codes; and
 calculating reception power by finding squares of correlation values of the in-phase signal and quadrature signal resulting from the second cumulative addition and adding the squares and obtaining timing information for establishing communication synchronization based on the calculated reception power.

6. A matched filter for performing correlation detection on one of a plurality of types of original signals, the matched filter comprising:
 a first correlation detector that performs despreading by multiplying a received spread spectrum signal with a common spreading code to obtain a despread data string, and that performs cumulative addition on the despread data string; and
 a second correlation detector that multiplies a data string output from the first correlation detector with each of a plurality of original signals in parallel or sequentially, performs a cumulative addition for every result obtained by multiplying one original signal, detects a correlation for each of the plurality of original signals and thereby detects the original signals included in the received spread spectrum signal.

7. A matched filter used for correlation detection on a reception side in a communication system, in which predetermined original signals are provided, the original signals having a periodic array formed by repeating a unit pattern of n symbols m times, the original signals being capable of including any of p types of symbol arrays as a result of the existence of p types of the unit patterns, and synchronization establishment signals being provided at a transmitting end by multiplying each of the p types of unit patterns with a common spreading code, wherein each of n, m and p are natural numbers equal to or greater than 2, the matched filter comprising:
 a despreader that performs despreading by multiplying received synchronization establishment signals with the common spreading code;
 a first cumulative addition section that delimits a symbol string obtained as a result of the despreading in units of n symbols, extracts symbols at a same position for every m sections, performs a cumulative addition for every set of the extracted m symbol data portions and obtains an n-symbol data string;

an original signal multiplier that multiplies the n-symbol data string with each of the p types of original signals sequentially, or that branches the n-symbol data string into at least two lines and multiplies each of the branched data strings with each of the p types of original signals in parallel, and that outputs a symbol data string of the multiplication result for each of the p types of original signals; and a second cumulative addition section that performs cumulative addition on each of the symbol data strings output for each of the p types of original signals, and that outputs a cumulative addition result for each of the p types of original signals.

8. A matched filter used for correlation detection on a reception side in a communication system, in which predetermined original signals are provided, the original signals having a periodic array formed by repeating a unit pattern of n symbols m times, the original signals being capable of including any of p types of symbol arrays as a result of the existence of p types of the unit patterns, and synchronization establishment signals being provided at a transmitting end by multiplying each of the p types of unit patterns with a common spreading code, wherein each of n, m and p are natural numbers equal to or greater than 2, the matched filter comprising:

a despreader that performs despreading by multiplying received synchronization establishment signals with the common spreading code;

a first cumulative addition section that delimits a symbol string obtained as a result of the despreading in units of n symbols, extracts symbols at a same position for every m sections, performs a cumulative addition for every set of the extracted m symbol data portions and obtains an n-symbol data string;

a memory that temporarily stores an addition result of the first cumulative addition section;

an original signal multiplier that multiplies n-symbol data, read from the memory at a predetermined speed, with each of the p types of original signals at a speed s times a reading speed from the memory using at least two lines of multipliers that operate in parallel, and that outputs a symbol data portion of the multiplication results for each of the p types of original signals, wherein s is an integer of 2 or greater; and a second cumulative addition section that performs cumulative addition on a set of symbol data portions output for each of the p types of original signals, and that outputs a cumulative addition result for each of the p types of original signals.

9. The matched filter of claim 7, wherein the original signal multiplier comprises:

a selector to which inversion bits, that invert signs of n symbol bits, and non-inversion bits, that do not invert signs, are input in parallel; and a control section that performs changeover control to select the inversion bit or non-inversion bit based on each bit array of the p types of multiplied original signals.

10. A CDMA communication base station apparatus that receives a CDMA-based signal comprising an array formed by repeating a basic data bit pattern, and that detects the existence of known codes with a predetermined periodicity in the CDMA-based signal, the CDMA communication base station apparatus comprising:

a matched filter comprising:

a despreader that performs despreading by multiplying the received signal by a spreading code, a first cumulative addition section that extracts, from a despread data bit string, a plurality of sets of data bits with positional relationships that correspond to cycles of the known codes, that performs a first cumulative addition on data bits for every set of the plurality of sets of extracted data bits, and that calculates a cumulative addition value for every set, a multiplier that multiplies a result of the first cumulative addition section with the known codes, and a second cumulative addition section that performs a second cumulative addition on each bit of a data string output from the multiplier and that obtains a correlation value for the known codes; and a timing information acquisition section that calculates a power of the received signal using the correlation values output from the matched filter and acquires timing information to establish synchronization for a communication with a mobile station.

* * * * *